Dec. 10, 1963     R. X. MEYER     3,113,427
GAS ACCELERATING METHOD AND APPARATUS
Filed Nov. 25, 1959     3 Sheets-Sheet 1

RUDOLF X. MEYER
INVENTOR.

BY Albert Rosen

ATTORNEY

Dec. 10, 1963 R. X. MEYER 3,113,427
GAS ACCELERATING METHOD AND APPARATUS
Filed Nov. 25, 1959 3 Sheets-Sheet 2

RUDOLF X. MEYER
*INVENTOR.*

BY *Albert Rosen*

*ATTORNEY*

Dec. 10, 1963 R. X. MEYER 3,113,427
GAS ACCELERATING METHOD AND APPARATUS
Filed Nov. 25, 1959 3 Sheets-Sheet 3
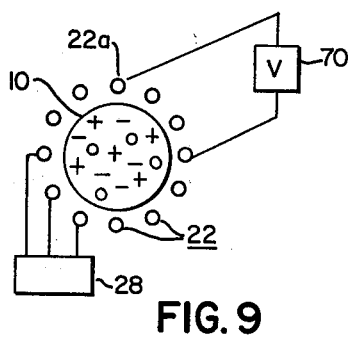
FIG. 9
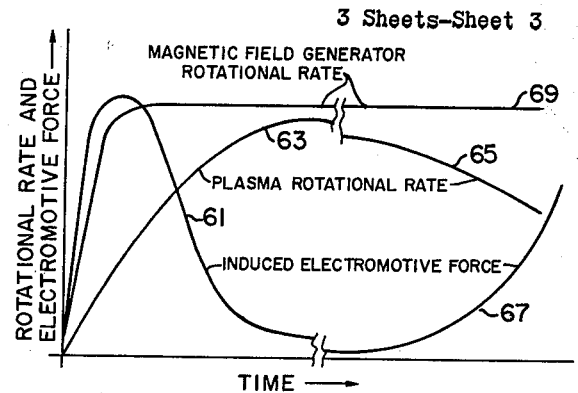
FIG. 10
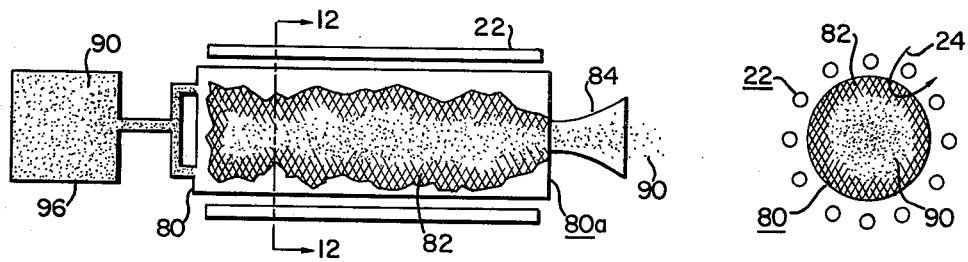
FIG. 11
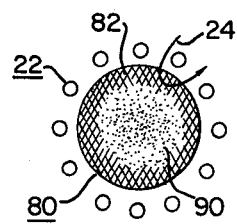
FIG. 12
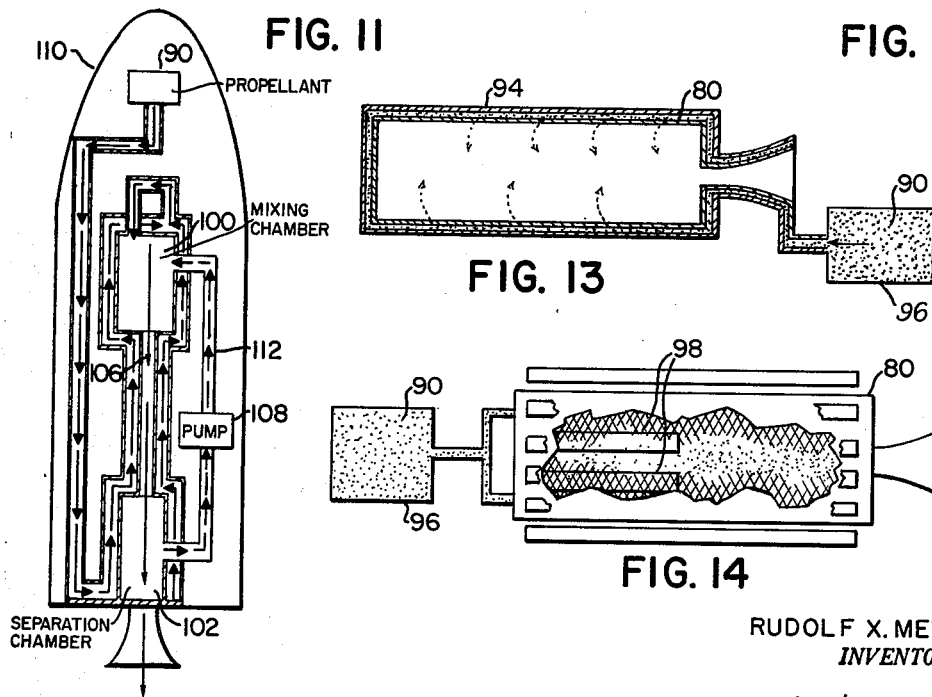
FIG. 13
FIG. 14
FIG. 15
RUDOLF X. MEYER
INVENTOR.
BY Albert Rosen
ATTORNEY

United States Patent Office 3,113,427
Patented Dec. 10, 1963

3,113,427
GAS ACCELERATING METHOD AND APPARATUS
Rudolf X. Meyer, Pacific Palisades, Calif., assignor to Space Technology Laboratories, Inc., Pacific Palisades, Calif., a corporation of Delaware
Filed Nov. 25, 1959, Ser. No. 855,330
10 Claims. (Cl. 60—35.5)

This invention relates generally to the art of magnetohydrodynamics, that is, the art treating the phenomena of motion of electrically conductive fluids in the presence of magnetic fields. In particular, the invention concerns improved methods and apparatus for obtaining and sustaining a high rotational speed of a gas without resort to rotating mechanical elements.

In certain applications it is desirable to expose gases to a high centrifugal force. If, for example, it is desired to separate a mixture of gases into its constituents, a device capable of rotating the gases at high speeds could be utilized. Such devices are generally called centrifuges. Since the actual force exerted on the constituents of the mixture would be proportional not only to the mass of each constituent but also to the square of its rotational velocity, the higher the velocity the more efficient the separation. If the molecular weights of the gases, and hence their masses, are relatively close in value, very high speeds are required to obtain any useful degree of separation with an appreciable degree of yield rate.

The usual type of centrifuge is mechanical in nature. Stress limitations imposed by the rotating mass of the structural assembly limits the maximum rotational speed obtainable to that equivalent to a tip speed of the order of 1000 feet per second. Such speeds have proven inadequate for efficient separation of gas mixtures, particularly where the constituents of the mixture have molecular weights comparatively close in value.

Accordingly, it is an object of this invention to provide an improved method and means for imparting high rotational speed to gases.

It is a further object to provide improved methods and means for obtaining sustained high rotational speeds of a gas without resort to the use of rotating mechanical components.

The foregoing and related objects are realized, according to this invention, by inducing rotational motion in an electrically conductive gas (a plasma) by means of time varying magnetic fields. For example, a chamber is filled with a plasma and a plurality of magnetic field generators are located around the outside of the chamber. These magnetic field generators are oriented to produce, within the chamber, magnetic fields that traverse the plasma. These generators are sequentially energized and de-energized. This subjects the plasma to a rotating magnetic field. The eddy currents generated in the plasma by this rotating magnetic field tend to drag the gas in the same direction as the direction of rotation of the magnetic field. After a period of time the rotational rate of the plasma will tend to approach the rotational rate of the magnetic field.

In one embodiment, where it is desired to separate a mixture of ionized gases into its constituents, the mixture is introduced into a cylindrical chamber. The rotating magnetic field induces a high rotational rate of the mixture and the resulting centrifugal force causes the various constituents of the mixture to assume approximately discrete annular layers around the axis of the chamber, thereby overcoming the natural tendency toward diffusion and mixing. The desired, separated constituents may be withdrawn by opening appropriate gas exits positioned at different, radially separated end portions of the cylindrical chamber. This arrangement is useful, for example, in separating an ionized, gaseous mixture into its constituents.

In another embodiment, the arrangement of the invention is useful in fission type nuclear reactor rocket engines. A gaseous fissionable material is used for propellant heating without loss of fissionable material from the engine system. In this embodiment the plasma subjected to the cyclic magnetic field is the fissionable gas used to heat a gaseous propellant. A rocket expansion nozzle is provided at one end of a generally cylindrical rocket engine chamber and coaxial with the chamber axis. A propellant, such as hydrogen, is introduced into the chamber and is thoroughly mixed with the fissionable plasma, thereby raising the propellant temperature. The centrifugal force induced in this mixture then tends to separate the fissionable material (plasma) from the propellant as the propellant flows toward the nozzle. Substantially complete separation takes place before the propellant enters the nozzle, where the propellant is allowed to expand through the nozzle to produce thrust in the conventional manner. The fissionable plasma is thus preserved from passage through the nozzle and is available for continual propellant heating within the chamber.

In the drawing, wherein like reference characters refer to like elements:

FIG. 9 illustrates aspects of operation of embodiments of the apparatus of this invention in measuring induced voltages;

FIG. 10 is a graph illustrating the relationship of magnetic field rotational rate, plasma rotational rate, and induced electromotive force, in apparatus of the invention;

FIG. 11 illustrates an embodiment of this invention as applied to a nuclear fission rocket engine;

FIG. 12 is a sectional view of the apparatus of FIG. 11 taken along the line 12—12 thereof;

FIG. 13 illustrates an alternative embodiment of a nuclear fission rocket engine according to this invention;

FIG. 14 illustrates another alternating embodiment according to this invention, as embodied in a nuclear fission engine; and FIG. 15 illustrates an embodiment of this invention as applied to a space vehicle.

This invention is predicated upon the use of characteristics exhibited by electrically conductive gas in the presence of magnetic fields to induce very high rotational velocities in the gas. As will be explained, these velocities are considerably in excess of those attainable with mechanical type centrifuges.

Figure 1:
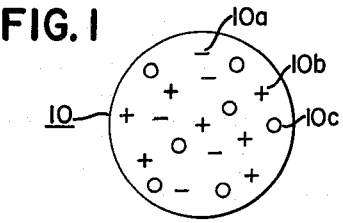
FIG. 1 is a schematic representation of a typical ionized gas.

For purposes of clarity the phenomena used in practicing the invention will be discussed prior to a detailed explanation of specific embodiments. Referring to FIG. 1, there is illustrated a typical electrically conductive, ionized gas 10, hereinafter called a plasma. The plasma 10, for the purposes of this invention, may be ionized to any degree and thus consists, basically, of three types of particles: negatively charged electrons 10a; positively charged ions or nuclei 10b (with or without bound electrons); and neutral atoms or neutrals 10c. With increasing degrees of ionization of the plasma 10, the charged particles (the electrons 10a and ions 10b) will increase in number and the neutrals 10c will decrease in number.

The electrons 10a in FIG. 1 act as current carrying electrons in a manner analogous to the current carrying phenomena exhibited in the usual electrical conductor as, for example, a copper wire. Therefore, as the degree of ionization of the plasma 10 is increased, the electrical conductivity of the plasma 10 is increased. As is described below, the greater the electrical conductivity of the plasma 10, the more efficient is the operation of apparatus of this invention.

Figure 2:
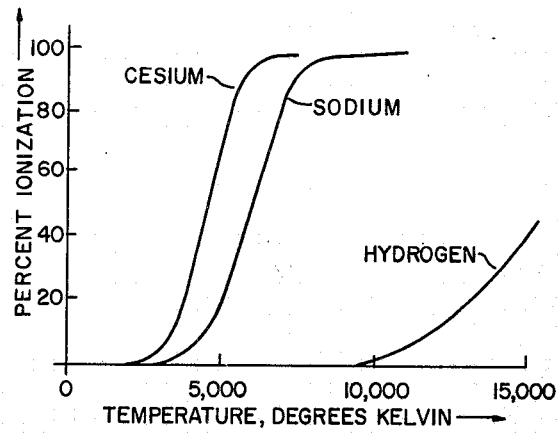
FIG. 2 is a plot of percent ionization versus temperature for a number of gaseous materials.

The curve of FIG. 2 illustrates the percent ionization of various gaseous materials as a function of temperature.

In some applications it is necessary to separate a mixture of gases wherein the characteristics are such that very high temperatures would be required to obtain an appreciable degree of ionization. Certain physical limitations, such as chamber strength at very high temperatures, may prohibit the operation at such temperatures. However, if some element such as cesium (which as shown in FIG. 2 ionizes at a low temperature) is added to the mixture, an effective increase is realized in the number of current carrying electrons in the mixture at a comparatively low temperature. This would give the same effect as that realized if the entire mixture had an appreciable degree of ionization due to high temperature operation. Operation in accordance with this invention may then be practiced upon this highly ionized mixture, and effective separation of the mixture into its constituents can be achieved at this lower operating temperature. Such a technique is referred to as "seeding." Seeding is generally useful whenever the effective amount of ionization at a given temperature is to be increased, as for example in fission reactors.

In the described embodiments of this invention, electrical currents are induced in the gas by interaction of the gas with a changing magnetic flux. A non-changing magnetic flux can be incorporated in a system to induce a rotation of the gas, but such a system requires the use of electrodes in direct contact with the gas to supply the required electric currents. However, the effects of corrosion of the electrodes due to high electric current densities and due to chemical reaction of the gas with the electrodes (for example, the corrosive effect of uranium hexafluoride on most materials) limits the useful life of such an arrangement. This corrosive effect increases with increasing plasma temperature, and thus this arrangement has a limited utility where comparatively long operating times a thigh temperatures are required.

Therefore, if there are to be no electrodes in contact with the plasma, some arrangement must be utilized to induce the rotation of the plasma by means purely external to the plasma.

Figure 3:
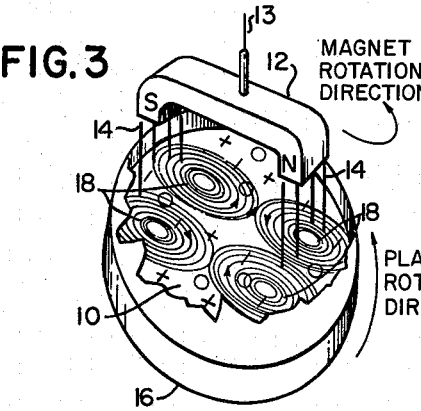
FIG. 3 illustrates a rotating magnetic field superimposed upon a container of plasma.

The phenomena of inducing rotation in the electrically conductive plasma may be better understood by reference to FIG. 3. This figure shows, in pictorial form, the forces acting to effect rotation of the plasma. Assume that a magnet 12 is being rotated counterclockwise about an axis 13. A hollow, cylindrical plasma container 16 (of a magnetically transparent material such as Pyrex glass) transmits magnetic flux 14 from the magnet 12 into the plasma 10. As the magnet 12 is rotated, its magnetic flux 14 cuts through the plasma 10. Since the plasma 10 is a conductor, the free, current-carrying electrons in the plasma 10 can carry current; thus eddy currents 18 are induced in the plasma 10 by the rotating magnet 12. By Lenz's law, the direction of the force developed by interaction between these eddy currents 18 in the plasma 10 and the magnetic flux 14 producing them will be such that the plasma 10 tends to follow the same direction of rotation as that of the magnet 12. (If we assume that the plasma 10 rotated at the same speed as that of the magnet 12, there would be no cutting of the magnetic flux 14 by the plasma 10, and thus no eddy currents 18 would be produced. This would not result in any induced force, and hence there could be no rotation of the plasma 10.) Thus, there must be some relative motion between the plasma 10 and the magnet 12 in order to produce the eddy currents 18 which result in the required rotational force.

The rotation of the plasma 10, then, is in the same direction as that of the magnet 12, only slower; the difference in rotational rate between the magnet 12 and the plasma 10 is defined as the "slip."

Figure 4:
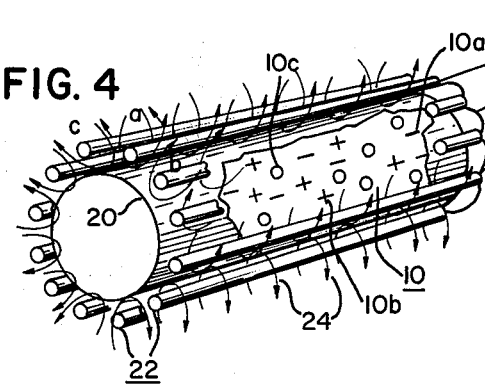
FIG. 4 illustrates the apparatus associated with the operation of one embodiment of this invention.

As will be discussed in connection with FIG. 4, it is possible to induce the rotation in the plasma by producing only the effect of a mechanical rotation of a magnet, instead of by actually rotating a permanent magnet. FIG. 4 shows an arrangement according to this invention comprising a hollow cylindrical chamber 20 surrounded by a plurality of magnetic field generators 22, which may be, for example, a plurality of electric windings. The chamber 20 is filled with a plasma 10. The magnetic field generators 22 are oriented so that the magnetic flux 24 generated by the magnetic field generators 22 traverses the chamber 20 and passes through the plasma 10. The magnetic field generators 22 shown in this configuration are connected to an alternator 28, which, for example, may be of the three-phase type. The magnetic flux 24 is rotated electrically by means of the three-phase current from the alternator 28, there being no mechanical rotation. The alternator 28 and magnetic field generators 22 are interconnected in a manner conventionally used in induction motors.

Figure 5B:
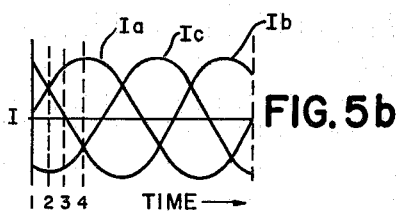
FIGS. 5a through 5e illustrate different aspects of the current flow in the magnetic field generators of the apparatus of FIG. 4.
Figure 5A:
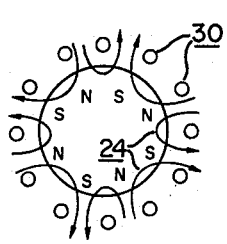
Figure 5C:
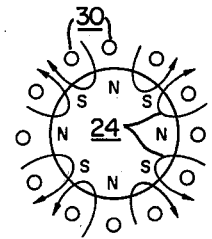
Figure 5D:
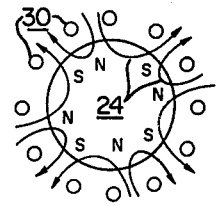
Figure 5E:
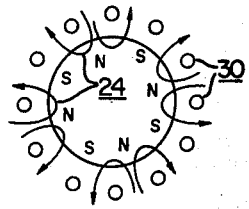

FIG. 5a shows, in schematic form, a typical magnetic field generator arrangement. Twelve magnetic field generators 30 are shown connected so as to produce four magnetic poles when connected to a three-phase alternator. The magnetic flux 24 in FIG. 5a is shown at time 4 in FIG. 5b. At this time 4 in FIG. 5b the current ($I_a$) in a first magnetic field generator is at a positive maximum value; the current ($I_b$) in a second magnetic field generator is at 50 percent of its maximum negative value; and the current ($I_c$) in a third magnetic field generator is also at 50 percent of its maximum negative value. Since the strength of the magnetic flux generated by an electrical current is proportional to the magnitude of the current, the magnetic flux 24 (shown schematically in FIG. 5a) represents the actual magnetic flux field strength and vector direction. Similarly, FIGURES 5c, 5d, and 5e show schematically the magnetic flux at times corresponding to times 1, 2, and 3, respectively, of FIGURE 5b.

As indicated in FIG. 5a, the magnetic poles (N and S) effectively rotate. When the magnetic field generators 22 of FIG. 4 are operated in a similar manner there is a rotation of the magnetic poles, the rotation being produced by the currents in the magnetic field generators 22. This magnetic pole rotation, in turn, generates eddy currents within the plasma 10, with the free electrons 10a carrying the current. These eddy currents, reacting with the magnetic flux 24, develop a force tending to produce rotation of the entire plasma 10. Collisions between the electrons 10a and nuclei 10b, and between the electrons and the neutrals 10c of the plasma 10 result in a net rotation of the entire plasma in the same direction as that of the electrons. Thus, with many electrons 10a present in the plasma 10 (i.e., a high degree of ionization of the plasma 10), more collisions will take place and the eddy currents will be stronger, resulting in a higher plasma rotational rate for a given set of operating conditions.

The speed of plasma rotation is dependent upon both the frequency of the alternating current supplied to the magnetic field generators 22 and upon the number of poles. Since the speed of rotation of the magnetic flux 24 (FIG.

4) is proportional to the frequency of the current for a fixed number of poles, a typical frequency multiplier 32 can be included in the circuit. This multiplier 32 will allow operation at high rotational speeds far in excess of speeds obtainable with mechanical type centrifuges. As the rotational speed is increased, the centrifugal force exerted on the plasma 10 increases. The entire plasma 10 is thus subjected to a high centrifugal force that can be sustained for virtually indefinite periods.

It will be appreciated that the particular orientation and interconnection of the magnetic field generators 22 in FIG. 4 is only one of many possible arrangements that can be utilized to accomplish the results of this invention. The basic requirement to be satisfied is that the rotating magnetic flux 24 traverses the plasma 10 in a direction such that the induced eddy currents interacting with the magnetic flux 24 produce a net rotation of the plasma 10.

Figure 6:
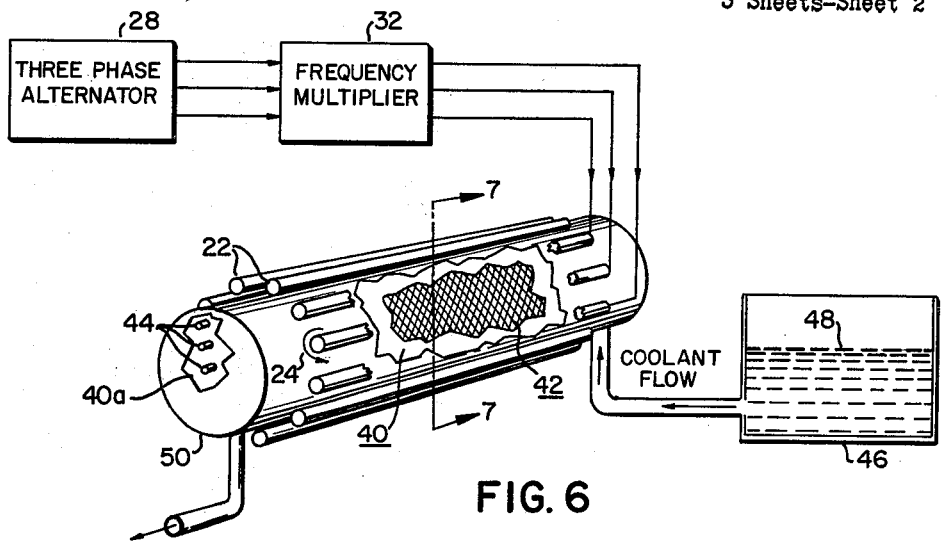
FIG. 6 illustrates the apparatus of this invention as associated with the separation of a mixture of ionized gases.

An embodiment of this invention is shown in FIG. 6 wherein a separation of a mixture of plasmas into its constituents is accomplished. In this embodiment a cylindrical chamber 40 is filled with a mixture of plasmas 42 (this filling process may occur simultaneously with the gas withdrawal to be described).

The magnetic field generators 22 are connected to a three-phase alternator 28 through a frequency multiplier 32. An end portion 40a of the chamber 40 is equipped with a plurality of radially spaced gas exits 44, located at predetermined distances from the longitudinal axis of the chamber 40. A coolant supply system 46 is provided to maintain the chamber 40 at temperatures lower than that of the plasma mixture 42. Coolant material 48, for example water, is pumped through the annular space formed by an outer cylinder 50 surrounding the chamber 40.

Figure 7:
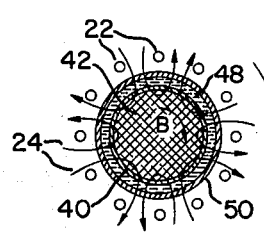
FIG. 7 is a sectional view of the apparatus of FIG. 6 taken in a plane along the line 7—7 thereof.

FIG. 7 shows a sectional view, along line 7—7, of the chamber 40 and the outer cylinder 50 of FIG. 6 during operation of the apparatus of FIG. 6. When the magnetic field generators 22 are energized, the rotating magnetic flux 24 induces rotation of the plasma mixture 42. As high rotational speeds of the plasma mixture 42 are achieved, centrifugal force will cause the heaviest particles to assume the form of an annular envelope at the periphery of the chamber 40. The next heaviest particles will assume an annular envelope of smaller radius than that of the heaviest particles. The lightest particles will assume a position at more central regions of the chamber 40. Since the actual force exerted on each individual particle is proportional to the square of its rotational velocity, even particles whose atomic mass values are comparatively close are effectively separated at the very high rotational speeds achieved by the embodiment of this invention.

The electrons in the mixture 42, even though the lightest particles in weight, generally will not exclusively occupy the center portion of the chamber 40. The electrostatic forces existing between the negatively charged electrons and the positively charged nuclei are so intense that the plasma mixture will tend towards electrical neutrality in any given unit volume.

The gas exits 44 (FIG. 6) may be individually or simultaneously opened to withdraw the contents of the chamber 40. The positions of the exits at the end portion 40a of the chamber 40 were selected so as to be coincident with the annular layers assumed by the particles.

It will be appreciated that the greater the rotational rate, the greater will be the maximum gas withdrawal rate (yield). Since the constituents of a mixture of gases have a natural tendency to diffuse, the rotational rate must be sufficient so that the centrifugal force overcomes this diffusion. Also, when a mixture of gases is moving at an appreciable velocity there is a tendency for turbulent mixing of the constituents of the mixture. Thus, high rotational rates are required to provide separation of the constituents so that the yield and purity of the yield may be maximized.

Figure 8:
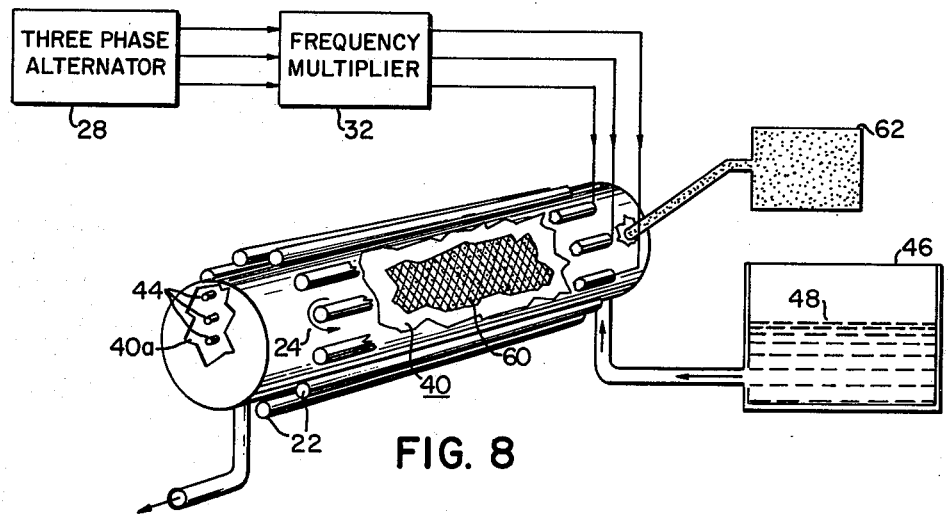
FIG. 8 illustrates the apparatus associated with the operation of this invention in the separation of a mixture of gases generally.

In many applications, operational temperature limits on the chamber prohibit sustained operation at a temperature sufficient to ionize each constituent of a gas mixture. The teachings of this invention can also be utilized to effect an efficient separation of such a gas mixture. This embodiment is illustrated in FIG. 8 wherein a chamber 40 is filled with a gas mixture 60 that is to be separated into its constituents. A gas 62 that ionizes at low temperatures, such as cesium, is introduced into the chamber 40 along with the other difficult-to-ionize material to be separated. The magnetic field generators 22 are connected as shown in FIG. 5 and operated through an alternator 28 and frequency multiplier 32 as shown in FIG. 8. The rotating magnetic flux 24 induces rotation in the cesium plasma within the chamber 49, which, in turn, causes rotation of the entire gas mixture. The centrifugal force associated with this rotation effectively separates the gas mixture into its constituents. The gas exits 44 on the chamber end portion 40a are opened to permit withdrawal of the separate constituents of the gas mixture, and the cesium portion of the mixture may either be allowed to remain in the chamber or be reintroduced along with new material to be separated into its constituents.

From the foregoing it is seen that substantially any gaseous materials may be separated from each other if the materials differ in molecular weight (or at molecule disassociation temperatures, atomic weight). Thus, even materials that differ in atomic weight by relatively small amounts, say uranium 235 and uranium 238, may be advantageously separated through the use of arrangements of the invention. In the case of uranium, the materials may be in the form of a normally gaseous compound, say uranium hexafluoride.

In the operation of embodiments of this invention it is seen that there is a relative motion between a conductor (the plasma) and the magnetic flux. Therefore, there will be a back electromotive force induced in the magnetic flux generators. For a given current characteristic the back electromotive force induced in the magnetic field generators 22 of FIG. 9 will be a maximum when the relative motion between the generators 22 and the plasma 10 is a maximum. This condition occurs in any embodiment of this invention during the existence of starting transients when operation is initiated. The minimum back electromotive force induced in the magnetic field generators 22 occurs when the plasma 10 reaches its maximum speed.

This back electromotive force characteristic, being a function of the rotational speed of the plasma 10, can be used as a control system to monitor and regulate the centrifugal force applied to the plasma. FIG. 10 illustrates graphically the relationship between the back electromotive force induced in the magnetic field generators 22, the rotational speed of the plasma 10, and the rotational speed of the magnetic field generators 22. A voltage sensing means 70 (FIG. 9) can be used to measure this back electromotive force. The value of the electromotive force indicates the rotational speed actually obtained by the plasma 10. This sensing means 70, as shown in FIG. 9, can be connected to control the current supplied to the field generators 22 by the alternator 28.

The curve 61 of FIG. 10 starts at a zero value and rises to a peak during the starting transient, and then decreases to a low value as the plasma rotational rate 63 increases to its maximum value (after the magnetic field generator rotational rate 69 reaches its steady-state value). It will be appreciated that as the plasma is withdrawn from the chamber, the "slip" between the plasma rotational rate and the magnetic field rotational rate will increase. This is shown by curve 65 which indicates the plasma rotational rate during withdrawal of the plasma from the chamber. Since the slip is increasing, the induced electromotive force will also increase as shown by curve 67. Thus the voltage sensing means 70 of FIG. 9 indicates the amount of plasma withdrawn as well as plasma rotational speed.

The inducement of a high rotational velocity of a plasma is utilized in another embodiment of this invention shown in FIG. 11. This embodiment is a fissionable gas rocket propulsion engine. The cylindrical chamber 80 contains a fissionable gas 82, for example high temperature uranium hexafluoride undergoing fission, which under these conditions is a plasma. One end portion 80a of the chamber 80 is equipped with a nozzle 84 located on the center line of the chamber 80. A propellant 90, for example hydrogen, is introduced from a storage tank 96 into the chamber 80 at some distance axially of the nozzle 84. Intimate contact and mixing of the propellant 90 with the uranium hexofluoride plasma 82 results in a heating of the propellant 90 to approximately the temperature of the plasma 82. At this temperature the propellant itself may become a plasma and thus add to the efficiency of operation. When the magnetic field generators 22 (FIG. 12) are operated to produce a rotating magnetic flux 24 the eddy currents generated in the plasma 82, reacting with the rotating magnetic flux 24, induce a rotation of the plasma 82. Collisions between the plasma 82 and the propellant 90 results in a high rotational rate of both the plasma 82 and the propellant 90. The heavier plasma 82 will be forced to the circumferential periphery of the chamber 80 in the form of an annular blanket and the lighter propellant 90 will then occupy the central, axial regions of the interior of the cylindrical chamber 80.

The propellant 90 (FIG. 11) then passes through the nozzle 84, expanding and producing thrust in the conventional manner of rocket propulsion engines. The plasma 82, held at the periphery of the chamber 80, does not escape and is thereby conserved within the chamber 80.

The propellant 90 may also be utilized as a coolant prior to introduction into the chamber 80, as shown in FIG. 13. This is accomplished by regenerative cooling of the chamber 80 wherein the propellant 90 passes through an annular jacket 94 surrounding the chamber 80 as the propellant 90 flows from the propellant storage tank 96 to the chamber 80. If the propellant 90 is introduced into the chamber 80 from locations circumferential of the chamber (as illustrated in FIG. 13) the propellant will be urged into more intimate mixing with the fissioning gas during its journey toward the axis of the chamber.

In order to reduce the weight and bulk of the apparatus, the walls defining the chamber 80 may be made of a high efficiency neutron reflector material, such as beryllium. The chamber 80 becomes, then, both a neutron reflector and a moderator for controlling the critical reaction of the fissioning gas. Furthermore, a neutron reflecting material that may easily take a gaseous form, such as lithium, may be added to the chamber in order to even further reduce the required dimensions of the gaseous fission reactor. Since lithium is intermediate in atomic weight between hydrogen and uranium, the lithium will in operation form an annular blanket inside of the annular uranium regions of the uranium blanket. Of course, the lithium can be used as a propellant too.

"Seeding" the plasma 82 with a material such as cesium may be utilized to further enhance the operation of the apparatus.

Solid fuel elements 98 (FIG. 14) may be included within the chamber 80. These elements 98 may be also regeneratively cooled by the propellant 90 and reduce the bulk of the engine even further by improving neutron economy and providing an additional measure of propellant 90 preheating.

Operation of the propulsion engine embodiments of this invention is independent of whether the fissionable gas or the propellant (or both) is the plasma. Thus, for example, the fissionable gas may be effectively a non-plasma at the selected operating temperature, but with the propellant a plasma at the same selected operating temperature. In this variation the magnetic field generators will induce a rotation in the plasma propellant which, in turn, will cause the non-plasma fissionable gas to rotate. However, due to the difference in molecular weights, the lighter propellant will still occupy axial regions of the chamber and the heavier fissionable gas will occupy circumferential regions of the chamber.

Gas temperatures in regions of the chamber may even exceed the melting point temperature of the walls defining the fission reaction chamber. The reason for this is that the heat is produced in regions spaced from the walls of the chamber, and the transpiration effect of introducing the cool propellant gas into the chamber through its walls cools the walls. Thus specific impulses of appreciably more than 1000 may be obtained. It is to be further noted that the walls may be preserved from the full heating effects of the fission reaction by establishing localized additional magnetic fields (not shown) in regions adjacent to the inner surfaces of the walls. These localized magnetic fields are oriented with respect to the rotating plasma in a known manner such that the interaction (of the moving plasma charges and the magnetic field) produces a resultant force on the plasma urging it away from the walls.

It will be appreciated that while in FIGS. 11 through 14 only one reaction chamber 80 is shown (both the mixing of the propellant 90 with plasma 82 and their ultimate separation prior to expansion through the nozzle 84, being effected in the same chamber), other arrangements can also be utilized. For example, FIG. 15 shows a variation wherein a mixing chamber 100 is physically separated from a separation chamber 102. The two chambers are interconnected by a duct 106 which is also regeneratively cooled by the propellant 90. Such an arrangement may be preferred, for example, in a space vehicle 110. A pump 108 and lines 112 are also provided in this embodiment for returning the fissionable gas material back to the mixing chamber 100 from the separation chamber 102.

From the foregoing, it is seen that this invention not only provides an improved method and apparatus for inducing very high rotational speeds in gases, but does so without resort to rotating mechanical components and thus allows the realization of rotational velocities free of mechanical stress considerations.

What is claimed is:

1. A gas accelerating apparatus of the kind capable of accelerating a plasma comprising, in combination: a chamber having walls defining a cavity adapted to contain a plasma to be accelerated; and cyclic magnetic field generating means oriented, with respect to said chamber, to subject the plasma to a cyclic magnetic field thereby to exert a force on said plasma inducing a rotation of said plasma within said cavity.

2. The gas accelerating apparatus defined in claim 1 wherein said apparatus further includes a voltage measuring means connected to said cyclic magnetic field generating means to measure voltage induced in said generating means by the relative motion of said generating means with respect to said plasma, thereby to provide information relative to the rotational velocity of the plasma.

3. The gas accelerating apparatus defined in claim 1, further including polyphase alternating current generating means, and wherein said magnetic field generating means is connected to be powered by the output of the polyphase alternating current generator means.

4. The gas accelerating apparatus defined in claim 3, further including frequency multiplier means connected between the polyphase alternating current generating means and the magnetic field generating means.

5. Gas accelerating apparatus of the type capable of accelerating a mixture of plasmas made up of constituents having at least two different masses, and of selectively separating said constituents according to their masses, comprising, in combination: a chamber having walls defining a cavity and adapted to confine the mixture of plasmas within the cavity; cyclic magnetic field generating means oriented to subject said mixture of plasmas to a cyclic magnetic field thereby to exert a force on said mixture of plasmas to effect a rotation of said plasmas within said chamber; and means coupled to said cavity to selectively extract at least some portions of said mixture of plasmas according to their masses.

6. Gas accelerating apparatus of the type capable of accelerating a mixture of plasmas made up of constituents having at least two different masses, and of selectively separating the mixture according to the masses of the constituents, comprising, in combination: an elongated inner chamber having walls defining a cavity adapted to confine therein a mixture of plasmas to be accelerated; an outer chamber around said inner chamber and having walls defining an annular cavity between said outer and inner chambers; said annular cavity adapted to circulate a cooling medium between the inner side of said outer chamber and the outer side of said inner chamber; coolant connection means connected to pass the cooling medium into said inner chamber from regions spaced from the long axis of said chamber; magnetic field generating means oriented so to subject the plasma mixture within the inner chamber cavity to a cyclic magnetic field, thereby to exert a force on said plasma mixture inducing a rotation of said plasma mixture within said inner chamber; and means coupled to said cavity to selectively extract at least a portion of the said constituents of said plasma mixture according to their masses.

7. The gas accelerating apparatus defined in claim 6 wherein said magnetic field generating means is adapted to receive polyphase alternating current; and said apparatus further includes alternating current generating means adapted to generate polyphase alternating current, frequency multiplying means connected to receive and multiply the frequency of said polyphase alternating current generated by said alternating current generating means, said frequency multiplier connected to transmit said multiplied frequency polyphase alternating current to said magnetic field generating means, and voltage measuring means coupled to said magnetic field generating means to measure induced voltages therein.

8. Gas separation method, comprising the steps of: injecting a mixture of different isotopes into a chamber; ionizing at least a portion of said mixture; establishing a rotating magnetic field in regions containing said isotope mixture, thereby inducing a rotation of said isotope mixture; and selectively extracting the constituents of said isotope mixture.

9. A gas separation method comprising the steps of: injecting a mixture of plasmas into a chamber; establishing a rotating magnetic field in regions containing said plasma mixture thereby inducing rotation of said plasma mixture; simultaneously and continually measuring an induced back electromotive force produced by interaction of the field and the plasma; sustaining said rotating magnetic field until after the induced back electromotive force is at a minimum; and simultaneously and selectively extracting the constituents of said plasma mixture.

10. A gas separation method, comprising the steps of: injecting a gas mixture into a chamber; injecting a plasma into the same chamber; establishing a rotating magnetic field in regions containing said gas mixture and said plasma thereby inducing a rotation of said plasma for inducing a rotation of said gas mixture; sustaining said rotating magnetic field while simultaneously and selectively extracting the constituents of said gas mixture.

References Cited in the file of this patent

UNITED STATES PATENTS

| | | |
|---|---|---|
| 2,798,181 | Foster | July 2, 1957 |
| 2,819,423 | Clark | Jan. 7, 1958 |
| 2,850,662 | Gilruth et al. | Sept. 2, 1958 |
| 2,894,891 | Grebe | July 14, 1959 |
| 2,917,443 | Grebe | Dec. 15, 1959 |
| 2,919,370 | Giannini | Dec. 29, 1959 |
| 2,929,952 | Giannini | Mar. 22, 1960 |
| 2,932,797 | Symon | Apr. 12, 1960 |
| 2,960,614 | Mallinckrodt | Nov. 15, 1960 |